Figure 1:
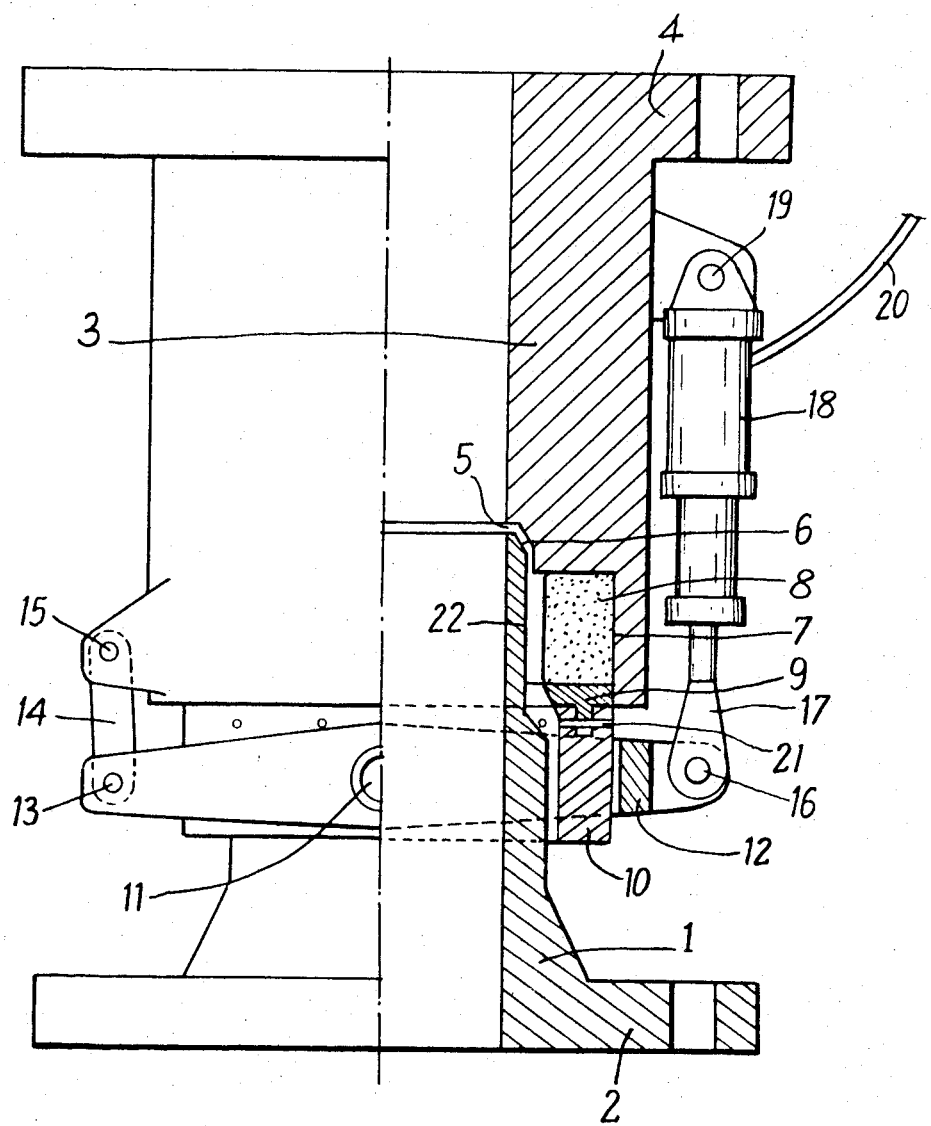

United States Patent
Houot et al.

[15] 3,645,565
[45] Feb. 29, 1972

[54] SEALINGTIGHT, CONTROLLED-FRICTION CONNECTING DEVICE BETWEEN TWO PIPE ELEMENTS

[72] Inventors: Jean-Jacques Houot, Sartrouville; Yves Pelissier, Pau; Jean-Francois Durand, Nantes, all of France

[73] Assignee: Establissement public a caractere industrial et commercial dite: Entreprise De Recherches Et D'Activites Petrolieres (Elf)

[22] Filed: Dec. 29, 1969

[21] Appl. No.: 888,658

[30] Foreign Application Priority Data

Dec. 31, 1968 France..................................183119

[52] U.S. Cl...............................................285/18, 285/338
[51] Int. Cl..........................................................F16l 55/00
[58] Field of Search............................285/18, 346, 338, 170

[56] References Cited

UNITED STATES PATENTS 494,918  4/1893  Evans..................................285/346 X
3,147,992  9/1964  Haeber et al. ...........................285/18

FOREIGN PATENTS OR APPLICATIONS 142,620  7/1951  Australia................................285/346
144,798  1/1952  Australia................................285/346
21,835   1909    Great Britain..........................285/346

*Primary Examiner*—Andrew V. Kundrat
*Attorney*—Holcombe, Wetherill & Brisebois

[57] ABSTRACT

A device for connecting two pipe elements to one another, comprising a sealing element which is deformable under mechanical force, and has a considerable potential deformation, and an assembly carried by one of the parts to be connected together and adapted to compress the said deformable sealing element, the assembly comprising a ring applied against the said sealing element and carried by rods fast with links bearing on the part supporting the said assembly and operated by a jack whose mobile element actuates the ring so as to effect the deformation of the said sealing element.

2 Claims, 2 Drawing Figures

Patented Feb. 29, 1972

3,645,565

2 Sheets-Sheet 1

SEALINGTIGHT, CONTROLLED-FRICTION CONNECTING DEVICE BETWEEN TWO PIPE ELEMENTS

This invention relates to a device adapted to provide a sealingtight connection between two pipe elements whilst allowing these pipes to be separated when subjected to a certain tractive force exerted on one of them.

An object of this invention is to permit the connection and separation of two contiguous pipe elements more particularly when they are not accessible.

A further object of the present invention is to make it possible to connect two pipeline elements to one another in cases where they are considerably out of alignment.

The device according to the invention which is adapted to connect two pipeline elements to one another comprises:

a. a sealing element which is deformable under mechanical pressure, and has considerable deformation potential, b. an assembly intended to compress the said sealing element, the assembly comprising a jack carried by one of the parts to be assembled, operating a ring by means of operating rods and links bearing on the part carrying the jack.

In a preferred embodiment, the jack used to create the compression of the sealing ring is a double-action jack.

Figure 2:
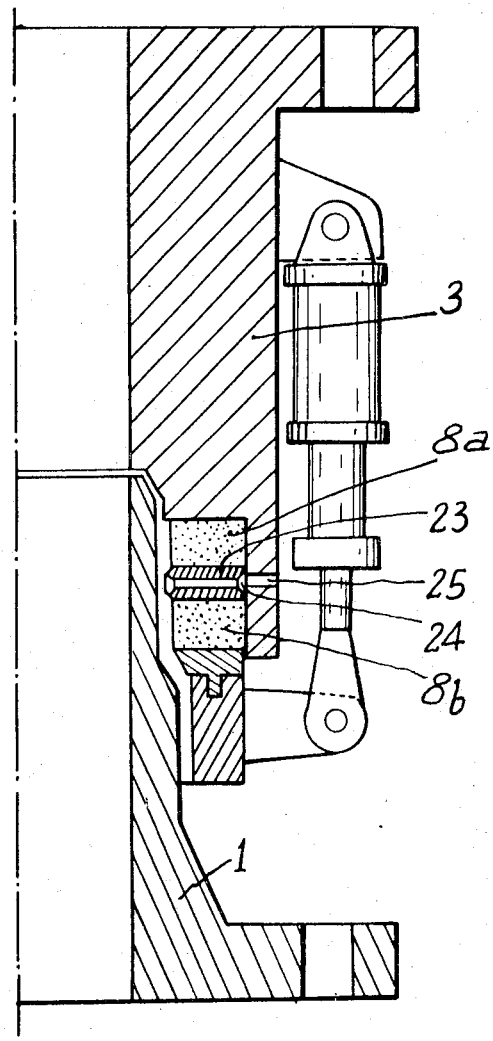

The invention will now be described, by way of example only, with reference to the accompanying drawings, in which:

FIG. 1 shows the device according to the invention partially in plan and partially in section and, FIG. 2 shows one particular form of embodiment.

In FIG. 1, there is shown a first pipe element 1 which is connected to a flange 2. A second pipe element 3 carries the device which is the subject of the present invention. This pipe element is fast with a second flange 4 and comprises an abutment face 5 and includes a conical portion intended to cover the end portion 6 of the part 1.

The first element 1 which is in the form of a body of revolution thus comes into contact with the second element 3 by the virtue of the abutment faces 5 and 6 bearing respectively on one another. The second element 3 comprises a cylindrical recess 7 in which is housed an annular sealing element 8 which can be deformed under pressure. This sealing element is carried by an annular part 9 which can slide freely in the housing 7. This annular part is caused to move by a member 10 which is pivotably connected by pivot pins 11 on opposite sides of the pipe to rods 12. These rods 12 are fixed at 13 to a link 14 bearing at 15 on the second element 3 and, also, by a pivot 16 bearing on a mobile arm 17 of a jack 18 pivotably connected at 19 to the said second element 3. Under the action of oil under pressure injected into the jack 18 through a pipe 20, the pressure rod 17 exerts a force on the rod 12 which bears at 13 on the link 14. This has the result of applying a force by way of the pivot 11 to the number 10 which pushes the annular part 9, connected by a pin 21 to the part 8. Thus there is obtained a compression of the sealing element 8 which is applied on the one hand against the housing 7 of the said second element 3 and against the bearing portion 22 of the first element 1. The assembly is provided with sufficient travel to allow the sealing element to be deformed so that it applies a force which ensures a sealtight fit against the bearing surface 22 of the first element 1. On the other hand, when put in position, that is to say when the sealing element is not crushed, the first element 1 can penetrate freely into the part 3 and can be positioned freely by means of the conical abutments 5 and 6. The deformation of the sealing element 8 is sufficient to make good any fault in the alignment made between the elements 1 and 3. The friction of the sealing element 8 on the bearing surface 22 is also sufficient to ensure a sealtight joint. However, this friction is relatively slight and accordingly when force is exerted on the element 3, it frees the connection.

In cases where this connection cannot be released under a suitable tractive force, the link 14 can be cut in order to break the connection. This is particularly advantageous in the cases of underwater connections where it is difficult for divers to work easily.

The jack 18 is a double-action jack, so that it is possible to subject the sealing element 8 either to a pulling or a compressive force. The clearance which exists, when the device is in the rest position, between the inner face of the sealing element 8 and the bearing surface 22 of the part 1 is relatively large so that considerable defects in coaxiality can be tolerated. Likewise the lateral travel of the sealing element 8 enables it to absorb any small relative offsetting which may occur during the course of clamping or after clamping between the two pipe elements 1 and 3 under the effect of normal or accidental stresses applied to these. This arrangement is particularly suitable in underwater use, where it constitutes a safety element.

A connector of this kind may be used more particularly as a safety joint each time it is necessary to protect a pipeline against unforeseen stresses, for example during the loading of a tanker ship, or whenever it is necessary to connect or separate rapidly two pipes the connecting or disconnecting of which in the normal way by flanges or screw-threaded connections would involve prohibitive delays.

This connector is particularly suitable for tubes of large diameter and can be operated by remote control, either in the free atmosphere or submerged in water.

The fact that the jack 18 can be operated by a single valve, which is thus the only control means of this connector, enables the device to be fixed in position and dismantled very quickly and operated with great simplicity.

Another embodiment is shown in FIG. 2, in which the sealing element 8 has been subdivided into two sealing elements 8a and 8b which are independent and are separated by a ring 23 perforated with radial communicating holes.

The presence of a fluid or pressure in the circular chamber 24 formed between the ring 23 and the body 3 can be detected or measured through the orifice 25 which can be provided with a manometer comprising an element for supplying a reading a long distance away.

This arrangement also makes it possible to test the seals at 8a and 8b by the application of a fluid under pressure between 8a and 8b, immediately after the positioning of the connector. Thus information is obtained without delay as regards the quality of the seal obtained.

I claim:

1. A device for connection to a male pipe member a female pipe member having an end dimensioned to receive said male pipe member, which device comprises a seat in said end of said female pipe member having a diameter greater than said male pipe member, a compressible sealing ring in said seat, an annular compression member axially slidable in said seat between a position compressing said compressible sealing ring and a position releasing said sealing ring, rod means pivotally attached to opposite sides of said compression member and extending transversely of said female pipe member, means at one end of said rod means pivotally connecting said rod means to said female pipe member, a fluid-operated jack comprising two relatively movable members, one of which is pivotally attached to said female pipe member and the other of which is pivotally attached to the other end of said rod means.

2. A device as claimed in claim 1 in which said compressible sealing ring comprises two independent sealing rings separated by a metal ring perforated by radial holes.

* * * * *